(12) United States Patent
Tadepalli et al.

(10) Patent No.: US 6,710,977 B2
(45) Date of Patent: Mar. 23, 2004

(54) AERODYNAMIC AIR CURRENT DIVERTING APPARATUS

(75) Inventors: Srinivas Tadepalli, Eden Prairie, MN (US); Cory Bert Welscher, Yukon, OK (US); Jonathan Pahl Jones, Piedmont, OK (US); Gregg Jon Severson, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 102 days.

(21) Appl. No.: 09/896,770

(22) Filed: Jun. 29, 2001

(65) Prior Publication Data

US 2003/0058573 A1 Mar. 27, 2003

Related U.S. Application Data

(60) Provisional application No. 60/233,919, filed on Sep. 20, 2000, and provisional application No. 60/249,959, filed on Nov. 20, 2000.

(51) Int. Cl.⁷ .................................................. G11B 5/55
(52) U.S. Cl. ..................................... 360/244.2; 360/266
(58) Field of Search ............................. 360/244–246.8, 360/266

(56) References Cited

U.S. PATENT DOCUMENTS

| | | | |
|---|---|---|---|
| 4,175,275 A | 11/1979 | Schaefer | |
| 4,189,759 A | 2/1980 | Bauck et al. | |
| 4,473,855 A | 9/1984 | Plotto et al. | |
| 4,821,130 A | 4/1989 | Bernett et al. | |
| 5,136,437 A | 8/1992 | Tabuchi et al. | |
| 5,854,725 A | 12/1998 | Lee | |
| 5,898,545 A | 4/1999 | Schirle | |
| 5,999,372 A | 12/1999 | Peterson et al. | |
| 6,091,570 A | 7/2000 | Hendriks | |

*Primary Examiner*—A. J. Heinz
(74) *Attorney, Agent, or Firm*—Jennifer M. Buenzou

(57) ABSTRACT

An air current diverting apparatus for a data storage device having a rotating data storage medium in operable relation with an actuator assembly reading data from and writing data to the data storage medium. The air current diverting apparatus has an aerodynamic shroud comprising a base having a first end attachable to the actuator assembly, an upstream surface extending upstream of the actuator assembly, and a downstream surface extending downstream of the actuator assembly and substantially non-parallel to the upstream surface.

24 Claims, 5 Drawing Sheets

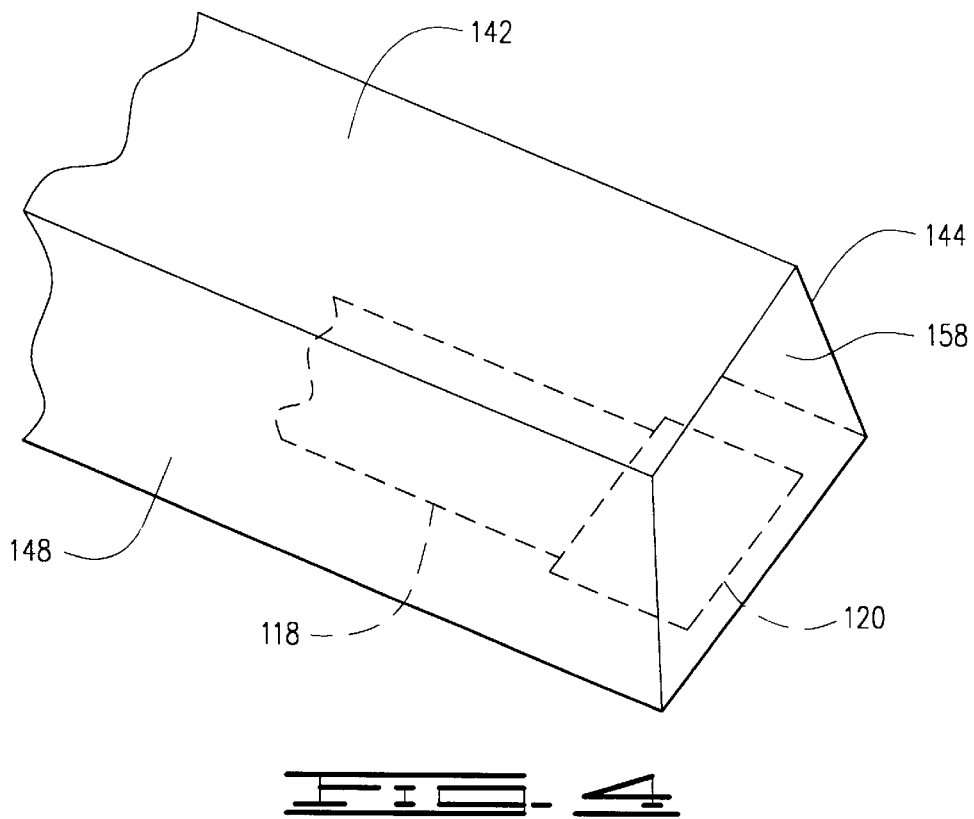
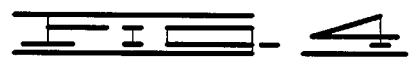
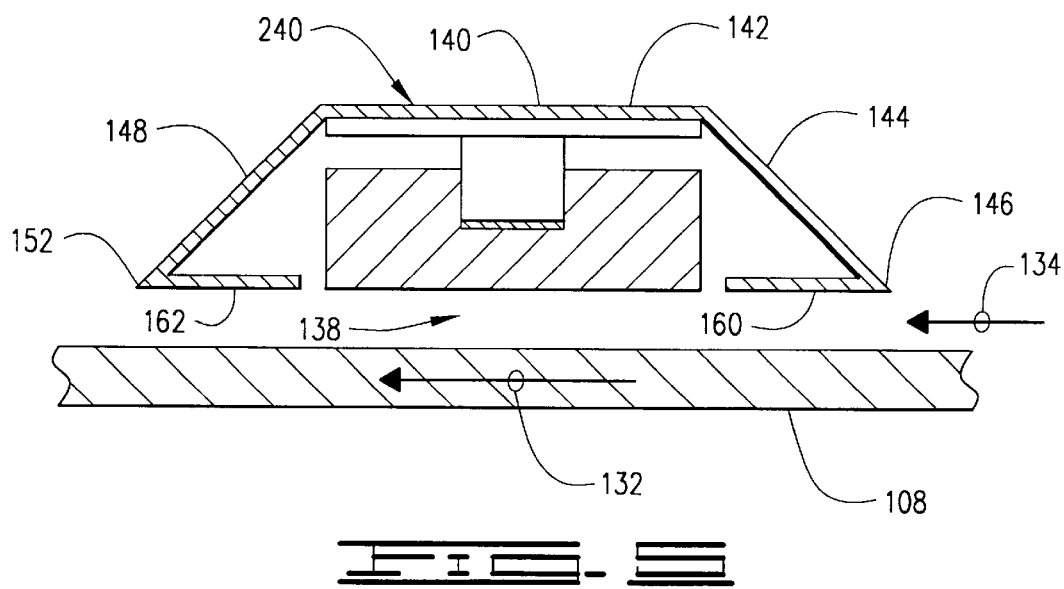
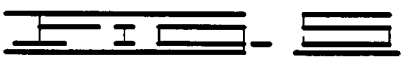

AERODYNAMIC AIR CURRENT DIVERTING APPARATUS

CROSS REFERENCE TO RELATED APPLICATIONS

This application claims the benefit of U.S. Provisional Application No. 60/233,919 filed Sep. 20, 2000 and the benefit of U.S. Provisional Application No. 60/249,959 filed Nov. 20, 2000.

FIELD OF THE INVENTION

This invention relates generally to the field of data storage devices, and more particularly but not by way of limitation to controlling the aerodynamic excitation imparted to read/write components by air currents generated by spinning data storage discs.

BACKGROUND OF THE INVENTION

Modern data storage devices such as disc drives are commonly used in a multitude of computer environments to store large amounts of data in a form that is readily available to a user. Generally, a disc drive has a magnetic disc, or two or more stacked magnetic discs, that are rotated by a motor at high speeds. Each disc has a data storage surface divided into a series of generally concentric data tracks where data is stored in the form of magnetic flux transitions.

A data transfer member such as a magnetic transducer is moved by an actuator to selected positions adjacent the data storage surface to sense the magnetic flux transitions in reading data from the disc, and to transmit electrical signals to induce the magnetic flux transitions in writing data to the disc. The active elements of the data transfer member are supported by suspension structures extending from the actuator. The active elements are maintained a small distance above the data storage surface upon an air bearing generated by air currents caused by the spinning discs.

A continuing trend in the industry is toward ever-increasing data storage capacity and processing speed while maintaining or reducing the physical size of the disc drive. Consequently, the data transfer member and supporting structures are continually being miniaturized, and data storage densities are continually being increased. The result is an overall increased sensitivity to excitation, both from external sources and from self-excitation sources, which adversely affect the positioning control systems moving the actuator relative to the spinning discs.

One source of excitation that can no longer be disregarded comes from the air currents moving within the disc stack and impinging on disc drive components. The air current velocity, and hence the associated forces, increase in relation to the radial distance from the axis of rotation. Thus, the air currents move faster and are more likely turbulent at outer portions of the discs. Turbulence can impart adverse vibrations, or aerodynamic excitation, to the discs (flutter) and/or to the actuator, particularly to the suspension members (buffeting). Turbulence can also be created by shedding vortices formed from the actuator wake as the airstream flows past the actuator, and also acting on the disc edges as the air currents are expelled from the disc stack. Further, wake excitation from the actuator increases disc vibration.

It has been determined that airstream excitation on the data transfer member can be reduced by an air current diverting apparatus comprising an air shroud with aerodynamic characteristics. It is to this improvement that embodiments of the present invention are directed.

SUMMARY OF THE INVENTION

Embodiments of the present invention are directed to an aerodynamic air current diverting apparatus for a data storage device, the data storage device having a rotating data storage medium such as a data disc with a recording surface. The data storage device further has an actuator assembly operably reading data from and writing data to the recording surface, the actuator having, in combination, an actuator arm with a first end adjacent a pivot axis and a second end attached to a flexure member supporting, in turn, a read/write head. The air current diverting apparatus has an aerodynamic shroud adaptively diverting air currents imparted by the rotating disc around the actuator assembly. The aerodynamic shroud comprises a base having a first end attachable to the actuator arm and extending substantially parallel to the disc terminating in a distal end. The aerodynamic shroud further comprises an upstream surface comprising a first end adjacent the base and a second end extending upstream of the actuator assembly. The aerodynamic shroud further comprises a downstream surface comprising a first end adjacent the base and a second end extending downstream of the actuator assembly and substantially non-parallel to the leading surface.

These and various other features as well as advantages which characterize the present invention will be apparent upon reading of the following detailed description and review of the associated drawings.

BRIEF DESCRIPTION OF THE DRAWINGS

FIGS. 4–9 are diagrammatic cross-sectional views similar to FIG. 3 illustrating a number of shrouds constructed in accordance with alternative embodiments of the present invention.

DETAILED DESCRIPTION

Figure 1:
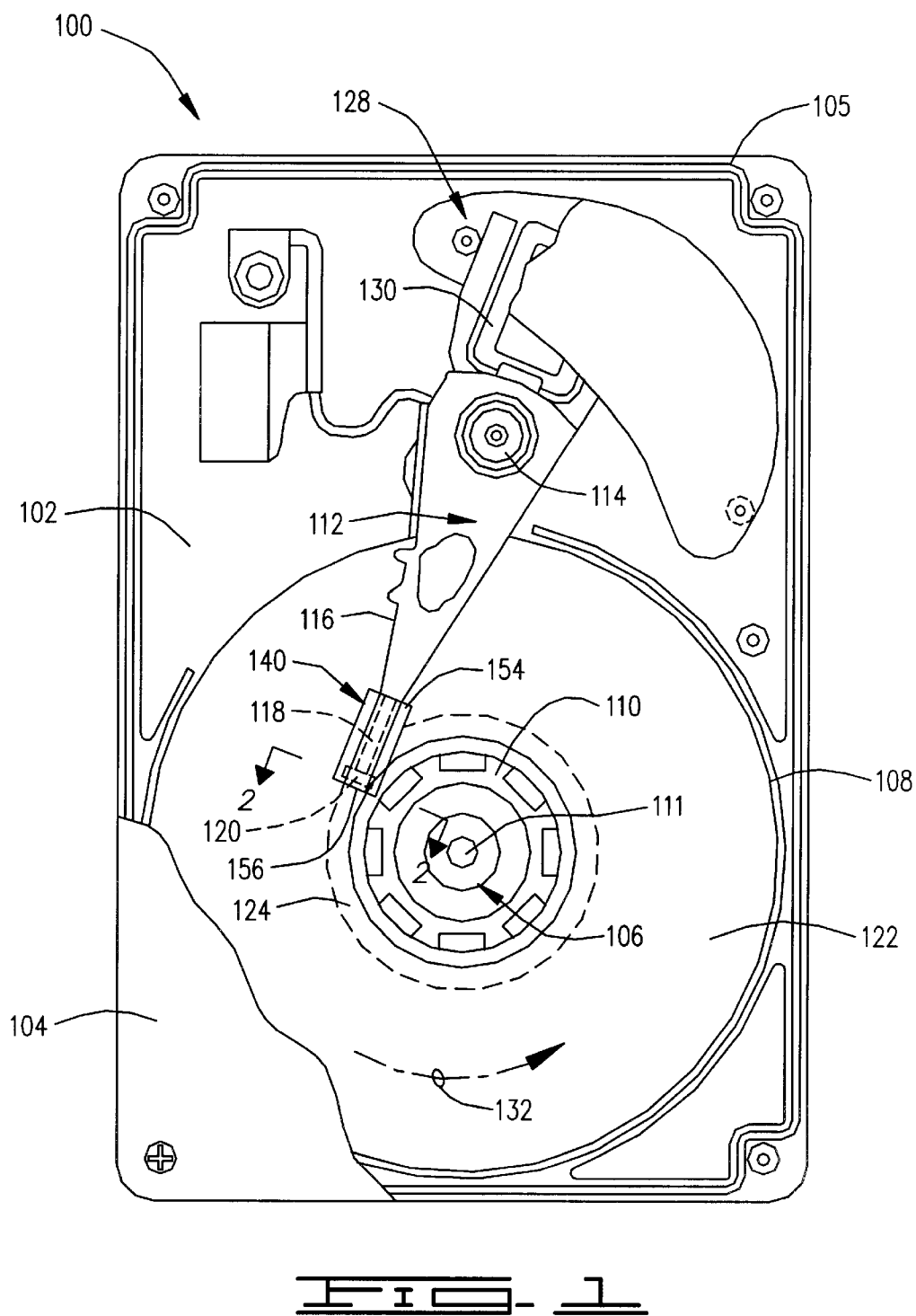
FIG. 1 is a plan view of a disc drive assembly constructed in accordance with an embodiment of the present invention.

Referring to the drawings in general, and more particularly to FIG. 1, shown therein is a plan representation of a disc drive 100 constructed in accordance with embodiments of the present invention. The disc drive 100 includes a base deck 102 to which various disc drive components are mounted, and a cover 104 (partially cut-away) which together with the base deck 102 and a perimeter gasket 105 form an enclosure providing a sealed internal environment for the disc drive 100. Numerous details of construction are not included in the following description because they are well known to a skilled artisan and are unnecessary for an understanding of the present invention.

Mounted to the base deck 102 is a motor 106 to which one or more discs 108 are stacked and secured by a clamp ring 110 for rotation at a high speed. Where a plurality of discs 108 are stacked to form a disc stack, adjacent discs 108 are typically separated by a disc spacer (not shown). An actuator 112 pivots around a pivot bearing 114 in a plane parallel to the discs 108. The actuator 112 has actuator arms 116 (only one shown in FIG. 1) that support load arms 118 (shown in hidden lines) in travel across the discs 108 as the actuator arms 116 move within the spaces between adjacent discs 108. The load arms 118 are flex members that support data transfer members, such as read/write heads 120 (shown in hidden lines), with each of the read/write heads 120 adjacent a surface of one of the discs 108 and maintained in a data reading and writing spatial relationship by a slider (not shown) which operably supports the read/write head 120 on an air bearing sustained by air currents generated by the spinning discs 108.

Each of the discs 108 has a data storage region comprising a data recording surface 122 divided into concentric circular data tracks (not shown). Each of the read/write heads 120 operatively interfaces with a respective desired data track to read data from or write data to the data track. The data recording surface 122 can be bounded inwardly by a circular landing zone 124 where the read/write heads 120 can come to rest against the respective discs 108 at times when the discs 108 are not spinning. Alternatively, the landing zone can be located elsewhere on the disc 108.

The actuator 112 is positioned by a voice coil motor (VCM) 128 comprising an electrical coil 130 and a magnetic circuit source. The magnetic circuit source conventionally comprises one or more magnets supported by magnetic poles to complete the magnetic circuit. When controlled current is passed through the actuator coil 130, an electromagnetic field is set up which interacts with the magnetic circuit causing the actuator coil 130 to move. As the actuator coil 130 moves, the actuator 112 pivots around the pivot bearing 114, causing the read/write heads 120 to travel across the discs 108.

As noted earlier, the motor 106 spins the discs 108 at a high speed as the read/write head 120 reads data from and writes data to the data storage surface 122. Kinetic energy transfers from the spinning discs 108 to air in the disc stack at the disc/air interface, forming air currents. The disc 108 rotation imparts a rotational force component to the air currents, and centrifugal force imparts a radial force component to the air currents. The resulting airstream spirals outwardly from the inner portion of the disc stack, ever-gaining velocity in relation to the faster linear speed of the discs 108 as the radial distance from the axis of rotation increases.

The air currents can adversely effect the reading and writing capability of the disc drive by aerodynamically exciting the actuator arm 116, the flexure member 118, and the read/write head 120. The read/write head 120 typically includes a relatively large air bearing surface that is lifted by the air currents to fly the read/write head 120 extremely close to the disc 108 surface. The flexure member 118 imparts an opposing spring force in order to dynamically balance the read/write head 120 at a desired fly height.

In view of the fact that nominal fly heights are continually being decreased, forces external to this dynamic balance, or "parasitic forces," are ever-more something that cannot be disregarded. Examples of such parasitic forces include external and internal vibrations, inherent oscillations of disc drive components, and air turbulence.

Turbulence can be created in different ways, such as the three dimensional wake downstream of the actuator. Compensating for this impinging engagement of the flow over the actuator can be complicated by the acceleration of the actuator assembly into the flow during track seek operations from an outer track toward an inner track.

Figure 2:
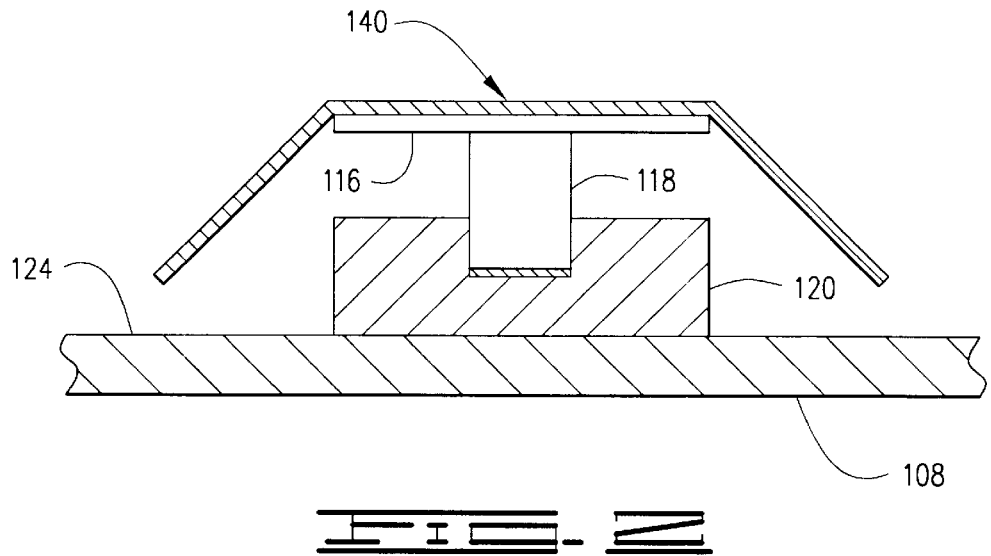
FIG. 2 is a diagrammatic cross-sectional view taken along the section line 2—2 in FIG. 1 at a time when the disc is not spinning and the read/write head in landed upon the data disc.

Turning now to FIGS. 1 and 2 which illustrate the read/write head 120 parked on the disc 108 surface in the landing zone 124 at a time when the disc 108 is not spinning.

Figure 3:
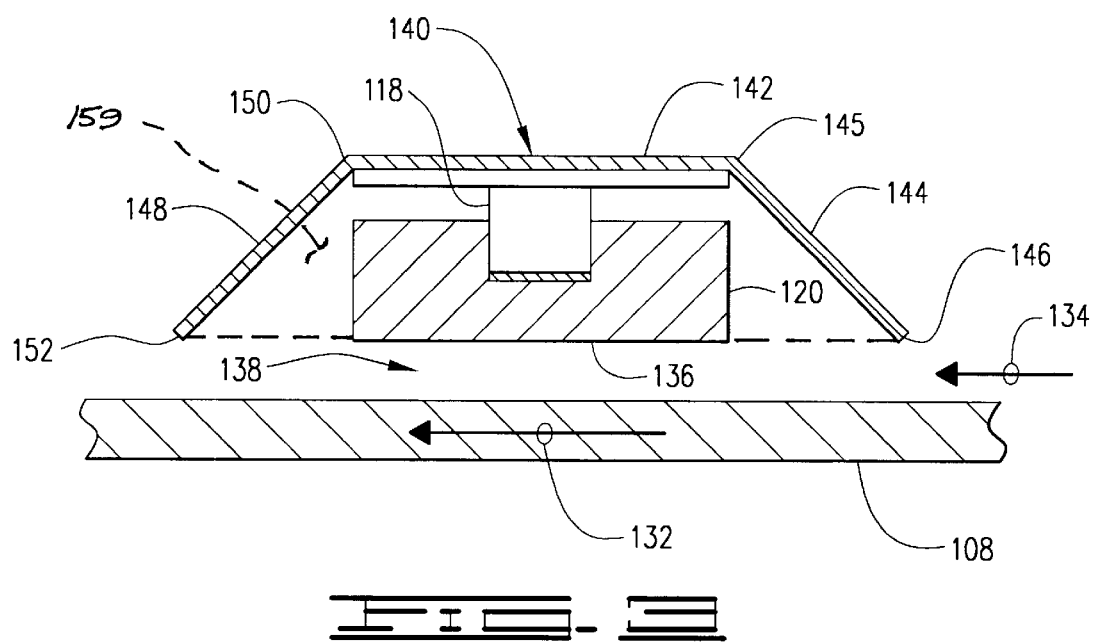
FIG. 3 is a diagrammatic cross-sectional view similar to FIG. 2 but at a time when the disc is spinning, imparting an air current to fly the read/write head off the data disc.

FIG. 3 is a view similar to FIG. 2 but at a time when the disc 108 is moving in direction 132 (shown in phantom lines in FIG. 1) to impart air currents shown diagrammatically acting along direction generally in the direction of disc 108 movement, shown by reference arrow 134. The read/write head 120 has an air bearing surface 136 that is lifted by the air current forces, and which is opposed by the flexure member 118 to dynamically balance the read/write head 120 at a desired fly height separated from the disc 108 by a desired gap 138. The air bearing surface 136 conventionally has aerodynamic leading surface features which are omitted in the present description because they are not necessary for an understanding of the embodiments of the present invention.

The actuator 112 further has an aerodynamic shroud 140 diverting the air currents around the actuator assembly 112. FIG. 3 shows the shroud 140 has a base portion 142 which is shown having a first end attached to a portion of the actuator arm 116. The base can be adhered or otherwise mechanically fastened to the actuator arm 116. Alternatively, the shroud 140 can be overmolded to the actuator arm 116. In another embodiment the base 142 can be joined to the actuator arm 116 in the same process that attaches the flexure member 118 to the actuator arm 116, such as by riveting or swaging processes.

The shroud 140 furthermore has an upstream surface 144 having a first end 145 adjacent to the base 142 and extending upstream of the actuator 112 with respect to the air currents moving in direction 134. The upstream surface 144 extends generally toward the disc 108 surface and terminates at a distal end 146 spaced away from the disc 108 such that a gap is provided for the air currents to effectively lift the read/write head 120. Otherwise, the air currents are directed around the actuator 112. Preferably, the upstream surface 144 provides an aerodynamic surface for a relatively smooth bending, or redirection, of the air currents to minimize the impingement effects on the leading side of the actuator 112 against the air currents.

The shroud 140 furthermore has a downstream surface 148 having a first end 150 adjacent to the base 142 and extending downstream of the actuator 112 with respect to the air currents moving in direction 134. Similar to the upstream surface 144, the downstream surface 148 extends generally toward the disc 108 surface and terminates at a distal end 152 spaced away from the disc 108 such that a gap is provided permitting the air currents acting through the air gap 138 to flow past the actuator 112. Also similar to the upstream surface 144, the downstream surface 148 also provides an aerodynamic surface for the air currents flowing past the actuator 112.

FIG. 3 illustrates a preferred embodiment wherein both upstream and downstream surfaces 144, 148 are angled relative to the air currents acting in direction 134. These angled upstream and downstream surfaces 144, 148 provide the actuator 112 with aerodynamic characteristics that minimize the impingement effects of the air currents. This embodiment is illustrative, however, and not limiting with regard to the aerodynamic shape of the upstream and downstream surfaces 144, 148. For example, while the embodiment of FIG. 3 illustrates linear surfaces, arcuate surfaces are contemplated as well within the many embodiments of the present invention. Also, although both surfaces 144, 148 are arranged to provide aerodynamic benefits, it may be beneficial to limit the aerodynamic features to only one or the other of the surfaces 144, 148, as is discussed more below.

The benefits of the shroud 140 in minimizing aerodynamic excitation must be balanced against the cost of additional mass on the actuator 112. Accordingly, the preferred embodiment of FIG. 3 illustrates a shroud 140 formed of a relatively thin-walled structure in order to minimize weight. The length of the shroud 140 can also be determined according to the needs of a particular application. In FIG. 1, for example, the shroud 140 extends from a first end 154 attachment to the actuator arm 116 to a distal end 156 that is disposed beyond the read/write head 120. Alternatively, in some cases it has been found that adequate protection is provided by extending the distal end 156 of the shroud 140 only to be disposed adjacent a portion of the flexure member 118, or to be disposed adjacent a portion of the actuator arm 116.

The upstream and downstream surfaces 144, 148 enclose the adjacent portion of the actuator on two sides thereof. In combination with the base portion 142, therefore, the adjacent portion of the actuator 112 is enclosed on three sides thereof. When the distal end of the base 142 extends beyond the read/write head 120 as in FIG. 1, then FIG. 4 illustrates the manner in which a distal surface 158 can join the upstream and downstream surfaces 144, 148 to enclose the read/write head 120 and the flexure member 118 on at least four sides thereof. Furthermore, any of the embodiments discussed herein can include an aft surface 159 (shown as phantom in FIG. 3) at the first end 154 joining the upstream surface 144 and the downstream surface 148, in order to enclose the read/write head on five sides.

FIG. 5 is a view similar to FIG. 3 but illustrating an alternative embodiment of the present invention wherein a shroud 240 similarly has upstream and downstream aerodynamic surfaces 144, 148 extending from a central supporting base 140. Additionally, an upstream enclosure surface 160 extends from the upstream surface distal end 146 and substantially parallel to the data disc 108. The upstream enclosure surface 160 guides the air currents entering the gap 138, further diverting them from the actuator 112. Similarly, the shroud 240 has a downstream enclosure surface 162 extending from the downstream surface distal end 152 and extending substantially parallel to the disc 108. The downstream enclosure surface 162 guides the air currents out of the gap 138 and past the actuator 112.

Figure 6:
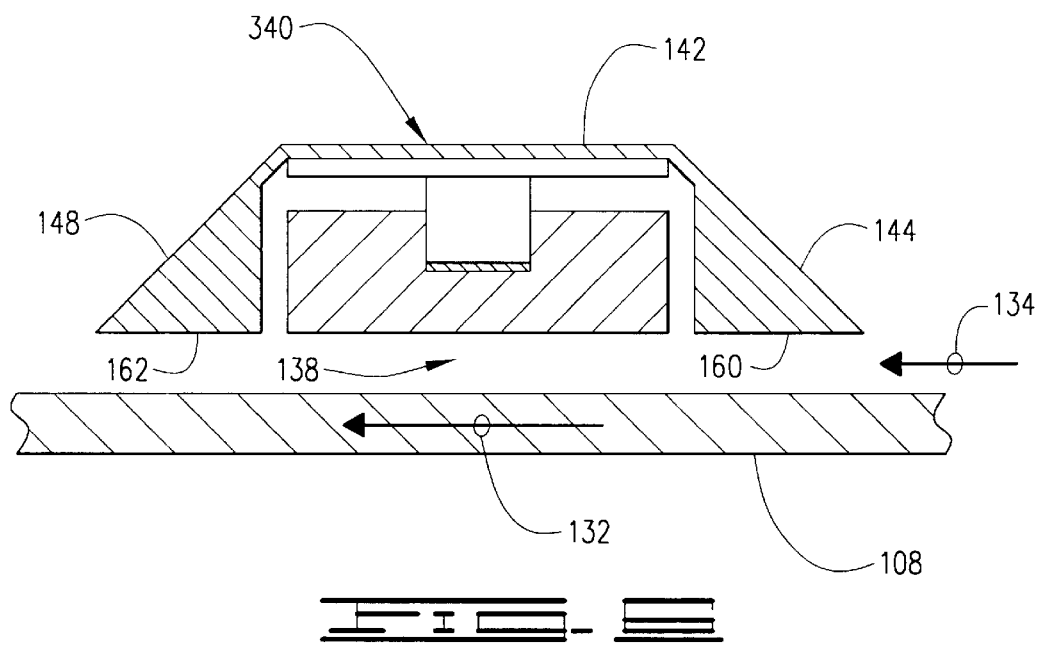
Figure 7:
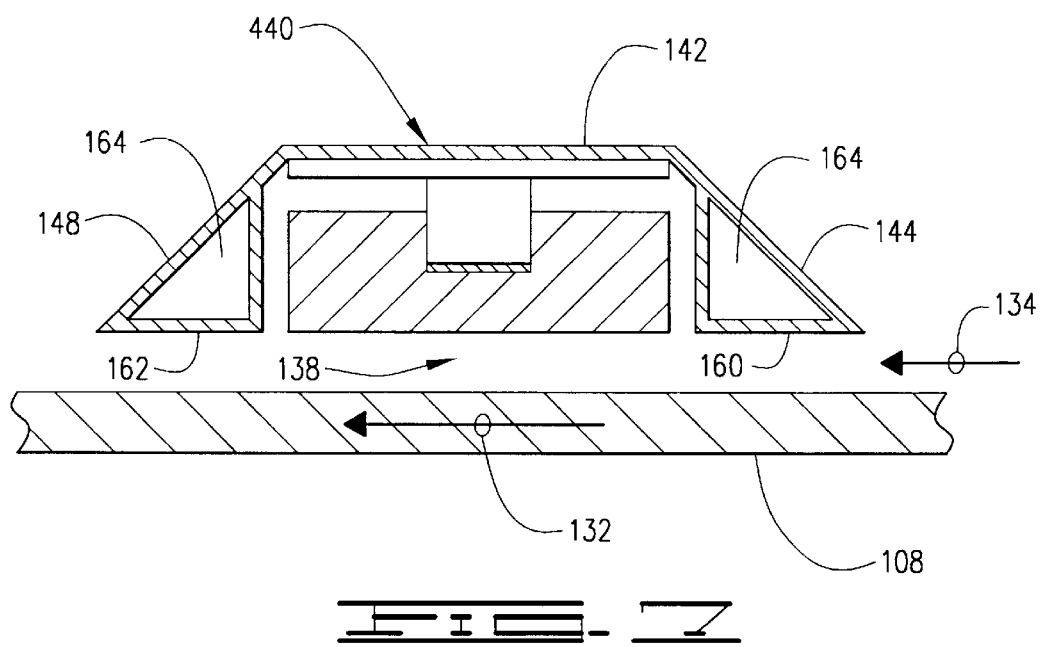

FIG. 6 illustrates a shroud 340 constructed in accordance with an alternative embodiment of the present invention wherein a substantially solid cross-section member is provided. It has been determined that equivalent performance can be achieved by using a relatively less-dense material to provide the aerodynamic surfaces previously described. Alternatively, FIG. 7 illustrates a shroud 440 similarly constructed of a substantially solid cross-section but having longitudinal openings 164 to reduce the weight.

Figure 8:
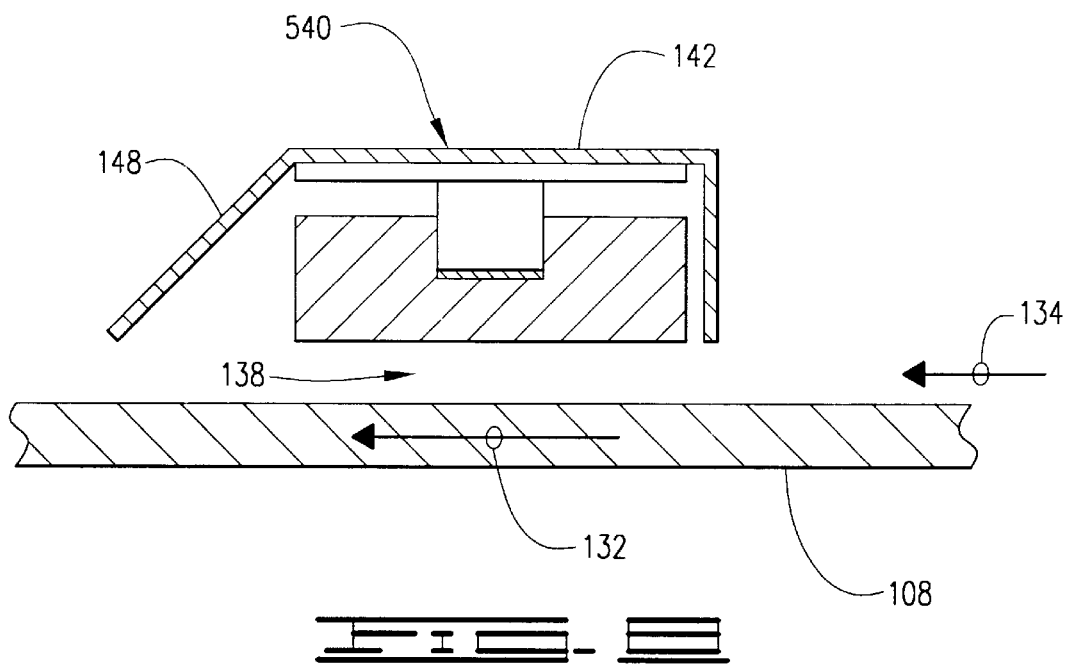
Figure 9:
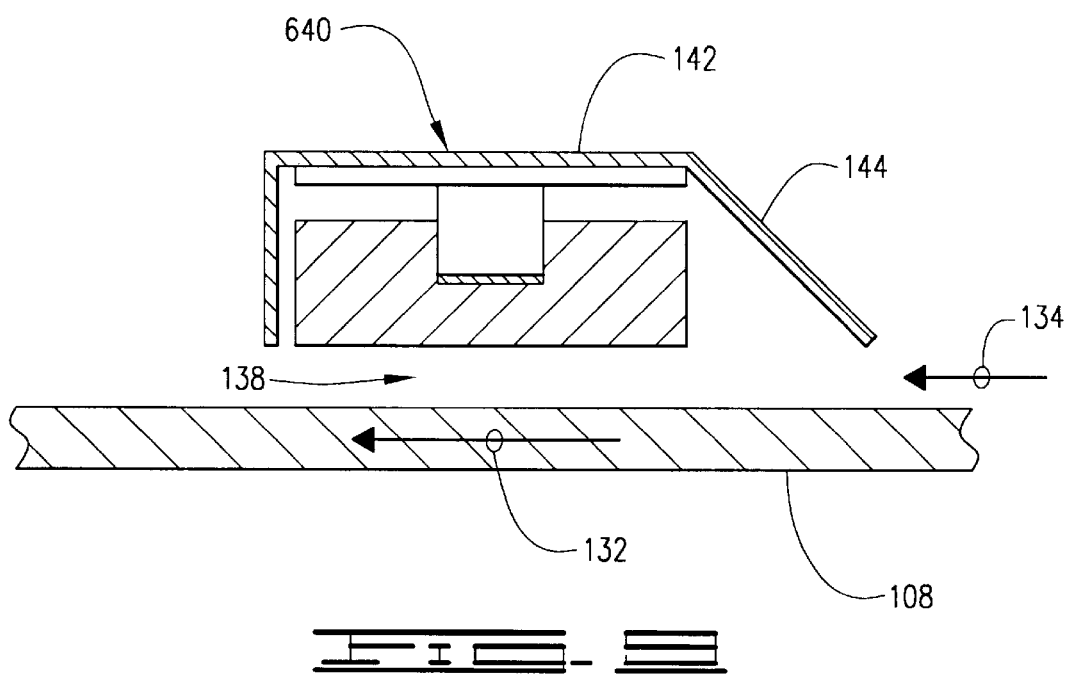

As discussed previously, the many embodiments illustrated and described hereinabove contemplate an aerodynamic shroud enclosing a desired portion of the actuator 112. Preferably, both the upstream and downstream surfaces 144, 148 of the shroud have aerodynamic response characteristics relative to the air currents moving in direction 134. It has been determined, however, that even if only one of the surfaces is characteristically aerodynamic then excitation effects are greatly reduced in comparison to no shroud and/or shrouds constructed in accordance with the present state of the art. For example, FIGS. 8 and 9 illustrate shrouds 540, 640, respectively, having only one aerodynamic surface. The downstream surface 148 of shroud 540 and the upstream surface 144 of shroud 640 provide substantially improved resistance to aerodynamic excitation, albeit less than the preferred embodiment, such that they are within the scope of the embodiments contemplated by the present invention. In all cases of the many embodiments of the present invention it will be noted from the illustrations and description hereinabove that in order to achieve the aerodynamic characteristics necessary to sufficiently reduce aerodynamic excitation, the upstream surface 144 is disposed relative to the downstream surface 148 such that they are non-parallel with regard to each other.

Although the illustrative embodiments shown illustrate a shroud constructed of a material having a substantially constant wall thickness, alternatively the material can be tapered to further provide an aerodynamic characteristic. The aerodynamic features can alternatively be machined as part of or into the actuator to eliminate the process step of attaching a separate component part. The shroud can furthermore be tapered from the first end 154 to the second end 156 where the read/write head 120 is narrower than the supporting portion of the actuator arm 116, so as to envelope the read/write head 120 as closely as possible.

In summary, a shroud (such as 140) is an integral part of an actuator (such as 112) in operable relation with a data storage medium (such as disc 108) in a data storage device (such as 100) to reduce parasitic forces created by the air currents created by the spinning discs. The shroud has aerodynamic features (such as 144, 148) that bend the air currents around the actuator to reduce the impinging effects of the air currents against the actuator. The shroud furthermore shields the actuator from the three dimensional wake on the downstream side of the actuator.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the size and placement of the air current diverting apparatus may vary depending on the particular application while maintaining substantially the same functionality without departing from the scope and spirit of the present invention. In addition, although the preferred embodiment described herein is directed to an air diverting apparatus for a disc drive assembly, it will be appreciated by those skilled in the art that the teachings of the present invention can be applied to other systems, like data storage test or certification systems or optical data storage systems, without departing from the scope and spirit of the present invention.

What is claimed is:

1. An air current diverting apparatus for a data storage device, the data storage device having a rotating disc with a recording surface and an actuator assembly operably reading data from and writing data to the recording surface, the actuator having, in combination, an actuator arm with a first end adjacent a pivot axis and a second end attached to a flexure member supporting, in turn, a read/write head; the apparatus comprising:

an aerodynamic shroud that partially encloses the actuator assembly, which adaptively divert air currents imparted by the rotating disc around the actuator assembly, the aerodynamic shroud comprising:

a base having a first end attachable to the actuator arm and extending substantially parallel to the disc terminating in a distal end;

an upstream surface comprising a first end adjacent the base and a second end extending upstream of the actuator assembly; and a downstream surface comprising a first end adjacent the base and a second end extending downstream of the actuator assembly and substantially non-parallel to the upstream surface.

2. The apparatus of claim 1 wherein the base distal end is disposed adjacent a portion of the actuator arm.

3. The apparatus of claim 1 wherein the base distal end is disposed adjacent a portion of the flexure member.

4. The apparatus of claim 1 wherein the base distal end is disposed past a distal edge of the read/write head.

5. The apparatus of claim 4 further comprising a distal surface joining the upstream and downstream surfaces enclosing the read/write head on four sides.

6. The apparatus of claim 5 further comprising rear surface proximal to the flexure member joining the upstream surface and downstream surface to enclose the read/write head on five sides.

7. The apparatus of claim 1 further comprising a downstream enclosure surface extending from the downstream surface second end and substantially parallel to the data disc.

8. The apparatus of claim 1 wherein the data storage apparatus comprises a disc drive assembly.

9. The apparatus of claim 1 further comprising an upstream enclosure surface extending from the upstream surface second end and substantially parallel to the data disc.

10. A disc drive, comprising:
   disc mounted to a spindle motor for rotation about a central axis, the disc having a recording surface; and
   an actuator assembly having an actuator arm with a first end adjacent a pivot axis and a second end attached to a flexure member supporting a read/write head, the actuator assembly further comprising an aerodynamic shroud that partially encloses the actuator assembly that divert air currents from the actuator assembly, the aerodynamic shroud comprising:
      a base having a first end attachable to the actuator arm and extending substantially parallel to the disc terminating in a distal end;
      an upstream surface comprising a first end adjacent the base and a second end extending upstream of the actuator assembly; and
      a downstream surface comprising a first end adjacent the base and a second end extending downstream of the actuator assembly and substantially non-parallel to the upstream surface.

11. The disc drive of claim 10 wherein the base distal end is disposed adjacent a portion of the flexure member.

12. The disc drive of claim 10 wherein the base distal end is disposed past a distal edge of the read/write head.

13. The disc drive of claim 12 further comprising a distal surface joining the upstream and downstream surfaces enclosing the read/write head on at least three sides.

14. The disc drive of claim 10 further comprising an upstream enclosure surface extending from the upstream surface second end and substantially parallel to the data disc.

15. The disc drive of claim 10 further comprising a downstream enclosure surface extending from the downstream surface second end and substantially parallel to the data disc.

16. The disc drive of claim 10 wherein the base distal end is disposed adjacent a portion of the actuator arm.

17. A disc drive assembly, comprising:
   a read/write head assembly operably moveable in a data reading and writing relationship with a data storage disc; and
   means for reducing turbulent air currents generated from the spinning data storage disc and acting on the read/write head assembly.

18. The disc drive assembly of claim 17 wherein the means for reducing turbulent air currents comprises a shroud moveable with the read/write head assembly and having non-parallel upstream and downstream surfaces enclosing the read/write head assembly on at least two sides.

19. The disc drive assembly of claim 18 wherein read/write head assembly comprises an actuator arm having a first end adjacent a pivot axis and a second end supporting a flexure member supporting, in turn, a read/write head, wherein the shroud encloses a portion of the actuator on at least two sides.

20. The disc drive assembly of claim 19 wherein the shroud encloses the read/write head on at least two sides.

21. The disc drive assembly of claim 20 further comprising a distal surface joining the upstream and downstream surfaces enclosing the read/write head on at least three sides.

22. The disc drive assembly of claim 19 further comprising an upstream enclosure surface extending from the upstream surface second end and substantially parallel to the data disc.

23. The disc drive assembly of claim 19 further comprising a downstream enclosure surface extending from the downstream surface second end and substantially parallel to the data disc.

24. The disc drive assembly of claim 19 wherein the shroud encloses a portion of the flexure member on at least two sides.

* * * * *